US012486555B2

(12) United States Patent
Hu et al.

(10) Patent No.: US 12,486,555 B2
(45) Date of Patent: Dec. 2, 2025

(54) PREPARATION METHOD OF IONIC RARE EARTH LEACHING AGENT

(71) Applicants: China Tin Nonferrous Metals Co., Ltd., Nanning (CN); China Tin Group Co., Ltd., Liuzhou (CN)

(72) Inventors: Mingzhen Hu, Nanning (CN); Yongping Nong, Nanning (CN); Deyan Zhou, Nanning (CN)

(73) Assignees: China Tin Nonferrous Metals Co., Ltd., Nanning (CN); China Tin Group Co., Ltd., Liuzhou (CN)

( * ) Notice: Subject to any disclaimer, the term of this patent is extended or adjusted under 35 U.S.C. 154(b) by 0 days.

(21) Appl. No.: 18/554,889

(22) PCT Filed: Sep. 5, 2023

(86) PCT No.: PCT/CN2023/117024
§ 371 (c)(1),
(2) Date: Jun. 16, 2025

(87) PCT Pub. No.: WO2024/008214
PCT Pub. Date: Jan. 11, 2024

(65) Prior Publication Data
US 2025/0313916 A1    Oct. 9, 2025

(30) Foreign Application Priority Data

Oct. 11, 2022 (CN) .......................... 202211242468.2
Apr. 7, 2023 (CN) .......................... 202310367797.8
Apr. 7, 2023 (CN) .......................... 202310367804.4

(51) Int. Cl.
*C22B 3/18* (2006.01)
*C12N 1/20* (2006.01)
(Continued)

(52) U.S. Cl.
CPC ................ *C22B 3/18* (2013.01); *C12N 1/205* (2021.05); *C22B 59/00* (2013.01);
(Continued)

(58) Field of Classification Search
None
See application file for complete search history.

(56) References Cited

U.S. PATENT DOCUMENTS

2022/0055042 A1* 2/2022 Farmer ............. B01D 11/0257

FOREIGN PATENT DOCUMENTS

CA    2911097 A1    11/2014
CN    102527318 A    7/2012
(Continued)

OTHER PUBLICATIONS

English translation of CN-108330298-A Description. (Year: 2018).*
(Continued)

*Primary Examiner* — Anthony J Zimmer
*Assistant Examiner* — Zachary John Baum
(74) *Attorney, Agent, or Firm* — DINSMORE & SHOHL LLP

(57) ABSTRACT

A preparation method of an ionic rare earth leaching agent includes the following steps: (1) domestication microorganisms with rare earth activated mineral powder culture medium to obtain a microbial suspension; (2) amplifying and culturing the microbial suspension and additives to obtain the amplified culture medium; and (3) mixing the modified *sesbania* gum with the amplified culture medium to obtain the ionic rare earth leaching agent. The activated mineral powder is the active metal-containing mineral powder in nature, which has excellent cation exchange function after activation, and the activated mineral powder and ionic rare earth mineral powder are used as the medium components to domesticate microorganisms, so that microorgan- (Continued)

isms can survive in the above-mentioned ionic solution and improve the leaching rate of synergistic leaching ionic rare earth.

7 Claims, 14 Drawing Sheets

(51) Int. Cl.
   *C12R 1/29*   (2006.01)
   *C12R 1/72*   (2006.01)
   *C12R 1/84*   (2006.01)
   *C22B 59/00*  (2006.01)

(52) U.S. Cl.
   CPC ...... *C12N 2500/10* (2013.01); *C12N 2500/40* (2013.01); *C12N 2501/10* (2013.01); *C12R 2001/29* (2021.05); *C12R 2001/72* (2021.05); *C12R 2001/84* (2021.05)

(56) References Cited

FOREIGN PATENT DOCUMENTS

| CN | 104096530 | A |   | 10/2014 |         |
|----|-----------|---|---|---------|---------|
| CN | 104291278 | A |   | 1/2015  |         |
| CN | 105331835 | A |   | 2/2016  |         |
| CN | 105753617 | A |   | 7/2016  |         |
| CN | 105905938 | A |   | 8/2016  |         |
| CN | 108330298 | A | * | 7/2018  | C22B 3/04 |
| CN | 108823407 | A |   | 11/2018 |         |
| CN | 108913882 | A |   | 11/2018 |         |
| CN | 109437286 | A |   | 3/2019  |         |
| CN | 111285397 | A |   | 6/2020  |         |
| CN | 111841583 | A |   | 10/2020 |         |
| CN | 112062104 | A |   | 12/2020 |         |
| CN | 112877252 | A |   | 6/2021  |         |
| CN | 113025836 | A |   | 6/2021  |         |
| CN | 113046552 | A |   | 6/2021  |         |
| CN | 113046579 | A |   | 6/2021  |         |
| CN | 113151696 | A |   | 7/2021  |         |
| CN | 113293287 | A |   | 8/2021  |         |
| CN | 113699389 | A |   | 11/2021 |         |
| CN | 114602509 | A |   | 6/2022  |         |
| KR | 20190123632 | A |   | 11/2019 |         |

OTHER PUBLICATIONS

English translation of CN 112877252 A Description. (Year: 2021).*
Jun, T., et al. Enhanced leaching process of a low-grade weathered crust elution-deposited rare earth ore with carboxymethyl sesbania gum. Hydrometallurgy 139 (2013) 124-131. (Year: 2013).*
Verma, S. and Ahuja, M. Carboxymethyl sesbania gum: Synthesis, characterization and evaluation for drug delivery. International Journal of Biological Macromolecules 98 (2017) 75-83. (Year: 2017).*
He, Z., et al. Leaching process and mechanism of weathered crust elution-deposited rare earth ore. Mining, Metallurgy & Exploration (2019) 36:1021-1031. (Year: 2019).*
International Search Report and Written Opinion of the International Searching Authority for PCT Patent application No. PCT/CN2023/117024.
Search Report dated May 11, 2023 for CN patent application No. 202211242468.2.
First Office Action dated Jan. 15, 2025 for CN patent application No. 202310367804.4.
First Office Action dated Jan. 15, 2025 for CN patent application No. 202310367797.8.
Xuekun Tang et al. "Research on Tianjing gum assisted leaching of low-grade weathering crust leaching type rare earth ore "Nonferrous Metals Science and Engineering, vol. 4, Issue 02, Apr. 15, 2013 (Apr. 15, 2013), 85-89, ISSN: 1674-9669, p. 86, left column paragraph 2 to p. 89, left column paragraph 4.
"Synthesis of In2Se3 homojunction photocatalyst with αand γ phases for efficient photocatalytic performance", RuiniaoWang et al., «Materialand Design» , vol. 151, pp. 74-82.
"Synthesis of tetragonal prismatic γ-In2Se3 nanostructures with predominantly {110} facets and photocatalytic degradation of tetracycline" , Xiaof an Wei et al., «Applied Catalysis B: Environmental» , vol. 260, pp. 118218:1-118218:9.

* cited by examiner

JiangXi of Quality Supervision and Inspection for Tungsten and Rare Earth Products Inspection report National Inspection XT(2022) 11568

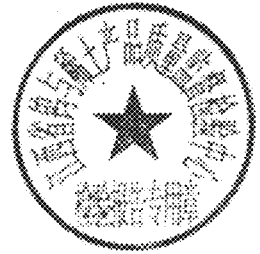

Customer name   Liuzhou Huaxi Nonferrous Design and Research Institute Co., LTD
Customer address   /
Sample name   Rare earth raw ore      Original number  GX-10
Delivery time   2022-08-23 16:24:59    Report date  2022-08-25
Sample grade /        Specification model  /     Sample state  solid
Detection basis XB/T 619-2015

| Inspection item | Unit | Inspection result | Inspection item | Unit | Inspection result |
|---|---|---|---|---|---|
| TREO (Full phase) | % | 0.12 | | | |
| TREO (Ionic phase) | % | 0.082 | | | |
| ***Following*** blank | | | | | |

Note   /

Chief Inspector: [signature]   Auditor: [signature]   Approver: [signature]

Business Consultation: 0797-8308020 Fax: 0797-8088495 Website: http://www.wxt.gov.cn

Figure 1

JiangXi of Quality Supervision and Inspection for Tungsten and Rare Earth Products Inspection report National Inspection XT(2022) 11569

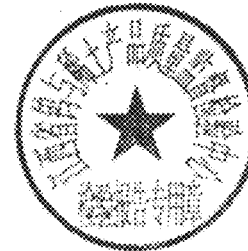

Customer name   Linzhou Huaxi Nonferrous Design and Research Institute Co., LTD
Customer address   /
Sample name   Rare earth leaching solution      Original number   GX-11
Delivery time   2022-08-23 16:47:12               Report date   2022-08-27
Sample grade /                  Specification model   /        Sample state   Liquid
Detection basis    GB/T 17417.1-2010

| Inspection item | Unit | Inspection result | Inspection item | Unit | Inspection result |
|---|---|---|---|---|---|
| Rare earth concentration | g/L | 1.02 | | | |

*** Following ***
blank

Note    /

Chief Inspector: 王文华       Auditor: 杨相庚       Approver: (signature)

Business Consultation: 0797-8308020 Fax: 0797-8088495 Website: http://www.wxt.gov.cn

Figure 5

JiangXi of Quality Supervision and Inspection for Tungsten and Rare Earth Products Inspection report National Inspection XT(2022) 11571

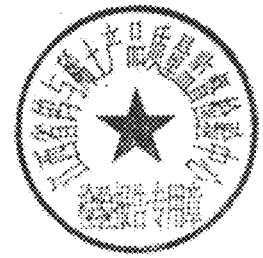

Customer name  Linzhou Huaxi Nonferrous Design and Research Institute Co., LTD

Customer address  /

Sample name  Rare earth leaching solution    Original number  GX-13

Delivery time  2022-08-23 16:47:12    Report date  2022-08-27

Sample grade /    Specification model /    Sample state  Liquid

Detection basis  GB/T 17417.1-2010

| Inspection item | Unit | Inspection result | Inspection item | Unit | Inspection result |
|---|---|---|---|---|---|
| Rare earth concentration | mg/L | 754.18 | | | |

*** Following ***
blank

Note  /

Chief Inspector: 王文华    Auditor: 杨相庚    Approver: (signature)

Business Consultation: 0797-8308020  Fax: 0797-8088495  Website: http://www.wxt.gov.cn

Figure 6

JiangXi of Quality Supervision and Inspection for Tungsten and Rare Earth Products Inspection report National Inspection XT(2022) 11572

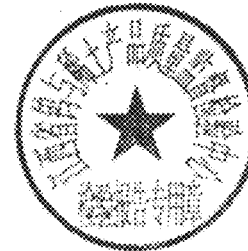

Customer name Linzhou Huaxi Nonferrous Design and Research Institute Co., LTD

Customer address /

Sample name Rare earth leaching solution   Original number GX-14

Delivery time 2022-08-23 16:47:12   Report date 2022-08-27

Sample grade /   Specification model /   Sample state Liquid

Detection basis GB/T 17417.1-2010

| Inspection item | Unit | Inspection result | Inspection item | Unit | Inspection result |
|---|---|---|---|---|---|
| Rare earth concentration | mg/L | 775.52 | | | |

*** Following ***
blank

Note /

Chief Inspector: 王久华   Auditor: 杨相庚   Approver: [signature]

Business Consultation: 0797-8308020 Fax: 0797-8088495 Website: http://www.wxt.gov.cn

Figure 7

JiangXi of Quality Supervision and Inspection for Tungsten and Rare Earth Products Inspection report National Inspection XT(2022) 11581

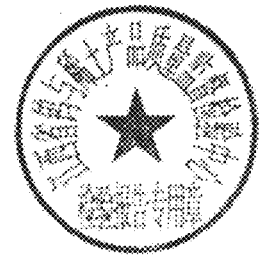

Customer name  Linzhou Huaxi Nonferrous Design and Research Institute Co., LTD

Customer address  /

Sample name  Rare earth leaching solution    Original number  GX- 23

Delivery time  2022-08-23 16:47:12    Report date  2022-08-27

Sample grade /    Specification model  /    Sample state  Liquid

Detection basis  GB/T 17417.1-2010

| Inspection item | Unit | Inspection result | Inspection item | Unit | Inspection result |
|---|---|---|---|---|---|
| Rare earth concentration | mg/L | 828.62 | | | |

\*\*\*\*\* Following \*\*\*\*\*
blank

Note  /

Chief Inspector: 王文华    Auditor: 杨相庚    Approver:

Business Consultation: 0797-8308020 Fax: 0797-8088495 Website: http://www.wxt.gov.cn

Figure 8

PREPARATION METHOD OF IONIC RARE EARTH LEACHING AGENT

CROSS-REFERENCE TO THE RELATED APPLICATIONS

This application claims priority to Chinse patents application Nos. 202211242468.2, filed Oct. 11, 2022; 202310367804.4, filed Apr. 7, 2023 and 202310367797.8, filed Apr. 7, 2023, all of which are hereby incorporated by reference in their entirety.

TECHNICAL FIELD

The present application belongs to the technical field of rare earth hydrometallurgy, and in particular relates to a preparation method of ionic rare earth leaching agent.

BACKGROUND

Rare earth resources, known as the "universal earth" are important strategic reserve resources in China. Rare earth materials such as permanent magnetic material, hydrogen storage material, luminescence material, catalytic material and other important manufacturing raw materials have become an important basis for the manufacture of new materials and a key resource for the development of cutting-edge defense technologies. China is rich in rare earth resources, forming a distribution pattern of light rare earths in the north and heavy rare earths in the south. Due to the backward technology and over-exploitation of rare earths in the early stage, while causing ecological damage, waste and loss of rare earth resources. Rare earth elements in ionic rare earth ores are adsorbed on weathered crust clay minerals such as kaolin and montmorillonite in the form of hydrated or hydroxyl hydrated cations, and the content of the rare earth elements is about 0.3% to 0.05%. When rare earth ions encounter chemically more active electrolyte cations ($K^+$, $Na^+$, $Mg^{2+}$, $Ca^{2+}$ and $NH_4^+$, etc.), rare earth ions can be exchanged and resolved from clay minerals.

In recent years, a leaching process based on ammonium sulfate in-situ leaching technology has been formed for the mining of ionic rare earths, but the total ammonia nitrogen in the leaching solution will pollute the water body, which no longer conforms to the development concept of rare earth mining and ecological friendliness. CN113699389A discloses a method for leaching and purifying rare earth concentrates. The method uses hydrochloric acid solution as a leaching agent to act on the rare earth concentrate powder, and stirs under conditions to carry out a trial experiment. However, this method uses hydrochloric acid, which is easy to acidize the leached slag, and the pH of the supernatant is too low, which needs to be treated to the discharge standard. In addition, the amount of rare earth ore in the actual mining process is large, the production of powder and the production under stirring conditions will increase a lot of costs, so it is not enough to provide a technical reference for industrial mining of ionic rare earth. CN113046579A discloses a biological and chemical synergistic method for leaching weathered crust elution-deposited rare earth ores. The leaching rate of ionic rare earths in the trial experiment can reach 98.30%, and the clean and efficient extraction of rare earths are realized under the premise of alleviating environmental pollution, but many chemical raw materials are used in the preparation process of the leaching agent, which increases the cost of rare earth extraction. CN113046552A discloses a method for leaching weathered crust elution-deposited rare earth ores using plant extracts. The method extracts pyrolysis liquid or wood vinegar from one or more raw materials of Chinese oak, bamboo, wild jujube, rice husk and corn cob, and then mixed with ammonium sulfate or magnesium sulfate, and then uses sulfuric acid or sodium hydroxide to adjust the pH value to 1 to 6. The leaching rate of ionic rare earths in the trial experiment was up to 93.7%. However, in this method, wood vinegar is used in collaboration with $NH_4^+$ to leach rare earth under acidic environment, which still cannot avoid the supernatant containing ammonia nitrogen, so it still needs to be improved. Literature "Effect of *sesbania* gum and its chemically modified products on the leaching of weathered crust elution-deposited rare earth ores", Rao Guohua et al., Hydrometallurgy, No. 2 (Total No. 54), June 1995, Page 10-13, in view of the features of weathered crust elution-deposited rare earth ore, *sesbania* gum was modified by sodium hypochlorite oxidation, carboxymethylation and phosphorylation, and the effects of original rubber and modified rubber on the leaching speed were investigated. The test results show that after adding *sesbania* gum, the filter performance of the filter cake is improved, the diffusion resistance in the exchange process is reduced, and the filtration strength is improved under the premise of ensuring the leaching rate of rare earths, which plays the role of flocculation and filter aid, but its leaching rate still needs to be improved.

SUMMARY OF THE INVENTION

The purpose of the present application is to solve the above technical problems and provide a preparation method for ionic rare earth leaching agent that is pollution-free, economical, safe and environmentally friendly, and has a high rare earth leaching rate.

To achieve the above purposes, a technical solution of the present application is:

A preparation method for ionic rare earth leaching agent, wherein, the method comprises the following steps:
  (1) domestication microorganisms with rare earth activated mineral powder medium to obtain a microbial suspension;
  (2) amplifying and culturing the microbial suspension and an additive to obtain an amplified culture medium; and
  (3) mixing a modified *sesbania* gum with the amplified culture medium to obtain an ionic rare earth leaching agent;
  As a further technical solution, in the step (1), the domestication is to inoculate the microorganisms into the rare earth activated mineral powder medium for cultivation, and the initial microbial inoculation amount is $\geq 1.2 \times 10^7$ cells/mL, the inoculation temperature is 15° C. to 60° C., and the domestication time is 36-240 h to obtain a microbial suspension. The microorganisms are one or more of actinomycetes and *saccharomyces*; the rare earth activated mineral powder medium is composed of 2 to 30 g/L carbon source, 5 to 15 g/L nitrogen source, 1 to 10 g/L growth factor, 0.42 to 4.2 g/L inorganic salt, 0.52 to 10 g/L rare earth activated mineral powder and balance water.
  As a further technical solution, the actinomycete is *micromonospora*, the *saccharomyces* is *candida* or *Pichia pastoris*, and the carbon source is one or more of fructose, lignin, calcium carbonate and protein; the nitrogen source is one or more of amino acid, protein, nitrate, peptone and urea; the growth factor is one or more of yeast extract, corn steep liquor and wort; and the inorganic salt is a combination of potassium nitrate, sodium chloride, potassium phosphate, magnesium sulfate and iron sulfate. The rare earth activated mineral powder is a combination of ionic rare earth mineral powder and activated mineral powder.

As a further technical solution, the amount of potassium nitrate is 0.1 to 1.2 g/L, and the amount of sodium chloride is 0.1 to 0.9 g/L, the amount of the potassium phosphate is 0.07 to 0.7 g/L, the amount of the magnesium sulfate is 0.1 to 0.9 g/L, the amount of the ferric sulfate is 0.05 to 0.5 g/L, the amount of the ionic rare earth mineral powder is 0.5 to 4 g/L, and the amount of the activated mineral powder is 0.02 to 6 g/L.

As a further technical solution, in the amplifying and culturing of the step (2), the culture temperature is 15° C. to 60° C., and the culture time is 36 to 240 h, the additive is added by 1% to 6% of the mass of the amplified culture medium, and the volume ratio of the microorganism suspension to the amplified culture medium is 1:10000 to 1:50.

As a further technical solution, the activated mineral powder is prepared by adding an activator is added to the mineral powder containing active metals according to the weight percentage, and then roasting at 400° C. to 900° C. for 0.5 to 5 h; the activator is one or more of calcium chloride, sodium chloride, potassium carbonate, magnesium carbonate and calcium carbonate; and the mineral powder containing active metals is one or more of mica powder, feldspar powder and bentonite; the amount of the activator is 5% to 40% of the weight of mineral powder containing active metals.

As a further technical solution, the mica powder is lepidolite ore powder; and the feldspar powder is one or two of potassium feldspar ore powder and sodium feldspar ore powder.

As a further technical solution, in the step (3), the *sesbania* gum is modified by adding 0.5 to 5.0 g of *sesbania* gum and 1.0 to 6.5 g of strong alkali solid to the 100 mL of monochloroacetic acid solution, and stirring for 5 to 60 minutes at a temperature of 10 to 35° C., placing the solution in a strong alkaline environment, then vigorously stirring at 40° C. to 80° C. for 1 to 6 h, and separating by suction filtration to obtain alkali metal modified carboxymethyl *sesbania* gum.

As a further technical solution, the amount of the modified *sesbania* gum is 0.05% to 0.2% of the mass of the ionic rare earth leaching agent.

In the present application, the modified chemical equation of alkali metal modified carboxymethyl *sesbania* gum is:
(1) Preparation of alkali metal solution of monochloroacetic acid: $ClCH_2COOH + MeOH = ClCH_2COOMe + H_2O$
(2) Alkali metal modified carboxymethyl *sesbania* gum: $[C_6H_7O_2(OH)_3]_n + nClCH_2COOMe = [C_6H_7O_2(OH)_2 OCH_2COOMe]_n + nMeCl + nH_2O$
wherein, Me is Na or K metal.

The principle of the present application is to utilize the excellent ion and cation exchange properties of organic acids, various proteases and mineral powder produced in the metabolic process of microorganisms, and through complexation or ion exchange, and adding modified *sesbania* gum in a synergistic manner to improve the permeability of the leaching agent and achieve the effect of increasing the leaching rate of ionic rare earths.

Compared with the prior art, the beneficial effect of the present application is:
1. The activated mineral powder in the present application is mineral powder containing active metals in nature, which has excellent cation exchange function after activation. The microorganisms were domesticated with activated mineral powder and ionic rare earth mineral powder as components of the medium, so that microorganisms could survive in the above ionic solution, and the leaching rate of ionic rare earth through synergistic leaching is improved.
2. The leaching agent of the present application is non-toxic and non-polluting. After the rare earth is precipitated from the leaching solution, the supernatant does not contain ammonia nitrogen, and the source of water pollution is eliminated from the source of the process. In addition, potassium ions can improve the soil, so that after the rare earth slag is leached, the rare earth slag is not polluted, but the soil quality of slag is improved. Thus, this is a green and environmentally friendly leaching agent.
3. The ionic rare earth leaching agent of the present application is obtained by amplifying and culturing the activated mineral powder with the domesticated microorganisms and the ionic rare earth mineral powder in nature, and the raw materials of the activated mineral powder, such as mica powder, feldspar powder, bentonite, etc., mineral powder containing active metals is composed of $K^+$, $Na^+$, $Mg^{2+}$, $Ca^{2+}$ and other chemical elements, and its natural reserves are abundant; *sesbania* gum is a product obtained by processing and separating the seeds of *sesban*, which is a natural polymer compound (its molecular weight is 250,000), so that the cost of raw materials is reduced, and the *sesbania* gum is economical and environmentally friendly.

Harmful organic pollutants produced by various industrial processes and human activities seriously affect water security. Water pollutants such as methyl orange, bromophenol blue, phenol and tetracycline pose a serious threat to the environment due to their high chemical oxygen demand and carcinogenicity. However, traditional water treatment techniques such as physical separation, biological methods, chemical reactions, etc. cannot completely remove these antibiotics.

Studies in recent years have shown that semiconductor catalysts can degrade tetracycline with the help of solar energy without secondary pollution. Photocatalysis, which combines natural energy sunlight with semiconductor materials, is one of the strategies to effectively eliminate pollutants in the water environment and has attracted great attention from researchers. Among various inorganic semiconductors, indium selenide has the characteristics of good electrical, optical and mechanical properties, low toxicity, environmental friendliness and the like. Indium selenide is a N-type semiconductor with a direct narrow bandgap of 1.36 to 2.0 eV, which makes it excellent in visible light absorption.

The preparation methods of indium selenide include hydrothermal method, solvothermal method, two-step hydrothermal calcination method, thermal evaporation method, chemical vapor deposition method, thermal injection method and molecular beam epitaxy method, etc. Wei et al. (Applied Catalysis B: Environment 260 (2020) 118218) reported the preparation of indium selenide by hydrothermal method, and the method comprised the steps of dissolving selenium powder in a mixed in solvent (NaOH solution+ hydrazine hydrate solution+EDTA solution), and then transferring the solution to an autoclave with $InCl_3 \cdot 4H_2O$ and sealed it for heating to finally get $\gamma$-$In_2Se_3$. Ding Wei et al. (Inorganic Chemistry Frontier, 2 (2015) 657) reported the preparation of indium selenide by a two-step hydrothermal calcination method, dissolving indium chloride and selenium oxide in a mixed solvent (water+ethylenediamine), and transferring the solution to an autoclave for sealing and heating to obtain a tetragonal non-porous In—Se-based precursor; then thermally decomposing the In—Se-based precursor in $N_2$ atmosphere to obtain a porous indium selenide quadrilateral. However, the current method for preparing indium selenide requires a long reaction time and complicated steps, which are not conducive to large-scale production and application. Therefore, it is of great significance to develop a simple method for indium selenide nano-photocatalytic materials.

The present application aims to provide a method for preparing $In_2Se_3$ nanomaterials for photocatalytic degradation of tetracycline. The prepared $In_2Se_3$ nanomaterials have excellent performance of photocatalytic degradation of tetracycline, and the preparation process is simple and easy to operate.

The present application provides a method for preparing the $In_2Se_3$ nanomaterials for photocatalytic degradation of tetracycline, wherein, the method comprises the following steps:
1) under the protection of an inert gas, adding the metal precursor of indium, selenium powder and solvent into a reaction vessel, mixing and stirring the mixture thoroughly, and keeping the mixture at 50° C. to 80° C. for 5 min to 30 min to mix well;
2) raising the temperature to 260° C. to 300° C., keeping for 30 min to 120 min to fully react the sample, and cooling to room temperature; washing the obtained reactant several times with an organic solvent, centrifuging, and vacuum-drying to obtain a powder product; and
3) dispersing the obtained powder product in an organic solvent, then putting it into a sealed container, keep stirring vigorously at room temperature for 5 h to 10 h, washing the obtained reactant with ethanol several times, centrifuging, and vacuum-drying to obtain $In_2Se_3$ photocatalyst.

According to one of the embodiments of the present application, the preparation method of the photocatalyst for tetracycline degradation, wherein, the metallic precursor of indium in step (1) is acetate, acetyl acetone, or chloride thereof.

According to one of the embodiments of the present application, the preparation method of the photocatalyst for tetracycline degradation, wherein, the molar ratio of the metal precursor of indium to the selenium powder in step (1) is 0.332 to 1.

According to one of the embodiments of the present application, the preparation method of the photocatalyst for tetracycline degradation, wherein, the solvent in step (1) is an alkylamine, optionally oleylamine, laurylamine or cetylamine.

The present application also provides the $In_2Se_3$ nanomaterial prepared by the method for preparing $In_2Se_3$ nanomaterial for the photocatalytic degradation of tetracycline, wherein the $In_2Se_3$ nanomaterial has the morphology of nanosheets and nanoparticles.

The present application also provides the $In_2Se_3$ nanomaterial prepared by the method for preparing $In_2Se_3$ nanomaterial for the photocatalytic degradation of tetracycline, wherein the $In_2Se_3$ nanomaterial has the characteristics of visible light absorption.

According to one of the embodiments of the present application, the organic solvent used for washing in steps (2) and (3) is one or more of normal hexane, ethanol and acetone.

According to one of the embodiments of the present application, the organic solvent used for dispersion in step (3) is toluene, mercaptopropionic acid, cysteine or ammonium thiocyanate.

The beneficial effects of the present application are:
1. The size and morphology of the provided $In_2Se_3$ nanomaterials can be adjusted by changing the reaction temperature and the ratio of reactants. The photocatalytic properties of indium selenide with different sizes/morphologies are different, but they still have good photocatalytic properties.
2. The $In_2Se_3$ nanomaterials is prepared by a liquid-phase one-pot method, the preparation process is simple, the reaction conditions are easy to control, the cost is low, and it is convenient for industrial production.
3. The prepared $In_2Se_3$ photocatalyst is used for tetracycline degradation at normal temperature and pressure, the preparation process is simple and easy to operate, and the photocatalyst has broad application prospects in the field of photocatalytic degradation.

With the continuous development of the industrialization process, textile, paper, paint, leather and other industries unreasonably discharge a large amount of industrial wastewater containing organic dyes. The organic pollutants represented by rhodamine B in industrial wastewater are highly toxic substances, which are difficult to remove once put into water, which will cause great harm to human health and the ecological environment. So far, a variety of methods have been applied in the treatment of wastewater containing organic dyes such as rhodamine B, such as chemical precipitation, photocatalytic degradation, membrane separation, biodegradation, and adsorption. However, these technologies still have various limitations in practical application. For example, although the photocatalytic degradation method is favored because of its environmental protection, it is currently expensive and inefficient. The biodegradation method has the problems of long repair time, slow effect speed, and the like, and the types of pollutants that can be decomposed are few. In contrast, adsorption technology is considered as one of the simplest, effective and economical methods to remove organic dyes. Therefore, it is very important to develop an efficient and green adsorption material.

Some traditional natural adsorbents such as activated carbon materials, clay, etc. have been developed for the removal of dyes in wastewater. However, the above-mentioned materials also have disadvantages such as not being resistant to acid and poor adsorption effect. As a novel adsorbent, metal sulfide nanomaterials have attracted extensive attention in dye wastewater treatment due to their high specific surface area, special microstructure and high surface activity. Among them, $SnS_2$ has the advantages of simple synthesis, high adsorption performance, and low cost, and is expected to become a new type of organic dye adsorbent. In addition, $SnS_2$ can stably present in acidic or neutral aqueous solution, which greatly expands its application in wastewater treatment. In previous studies, researchers have carried out a lot of work on the synthesis strategy for optimizing the nanostructure of $SnS_2$. Umar A et al. (Talanta, 2013, 114: 183-190.) synthesized a $SnS_2$ nanosheet with curled shape and disordered distribution by hydrothermal method. However, highly toxic organic solvents such as acetone need to be used in the synthesis process, which will cause greater environmental pollution. Sreedevi Gedi et al. (RSC Advances, 2015, 5 (31): 24640-24648.) prepared $SnS_2$ nanoparticles by chemical precipitation and used them to adsorb the organic dye rhodamine B in aqueous solution. However, $SnS_2$ nanoparticles are prone to agglomeration, which greatly reduces its adsorption efficiency. Therefore, it is of great significance to develop a simple method for preparing tin disulfide nanomaterials to adsorb organic dyes in industrial wastewater.

The purpose of the present application is to provide a method for preparing sheet tin disulfide nanomaterial for efficient adsorption of organic dyes. The prepared nanomaterial flower shape $SnS_2$ maintains the advantages of high specific area of the nanomaterial and avoids the phenomenon of agglomeration which is easy to occur due to the small size of the nanomaterial. Moreover, the layered hierarchical structure can effectively improve the diffusion of dye molecules, provide a more excellent transport path, and provide a large number of adsorption sites for the adsorption process.

The present application provides a method for preparing sheet tin disulfide nanomaterial for efficient adsorption of organic dyes, wherein, the method comprises the following steps:

1) weighting an appropriate amount of stannous chloride dihydrate ($SnCl_2$ $2H_2O$) and sulfur source, dissolving them in 35 mL of solvent, and stirring magnetically at room temperature for more than 1 hour to mix well;
2) transferring the mixed solution in step 1) to a 50 mL polytetrafluoroethylene-lined reaction kettle, placing the reaction kettle in a constant temperature blast drying oven and raising the temperature to 200° C. to 220° C., and keeping for 8 h to 12 h; and
3) centrifuging after the reaction kettle is cooled to room temperature, and washing the precipitate with deionized water and ethanol, and then vacuum-drying at 60° C. for 8 h to obtain tin disulfide nanomaterials.

According to one of the embodiment of the present application, the method for preparing sheet tin disulfide nanomaterials for efficient adsorption of organic dyes, wherein, the sulfur source in step (1) is thiourea ($CH_4N_2S$), L-Cysteine (L-Cys) or thioacetamide (TAA).

According to one of the embodiment of the present application, the method for preparing sheet tin disulfide nanomaterials for efficient adsorption of organic dyes, wherein, the molar ratio of the stannous chloride dihydrate to the sulfur source in step (1) is 0.1 to 0.2.

According to one of the embodiment of the present application, the method for preparing sheet tin disulfide nanomaterials for efficient adsorption of organic dyes, wherein, the solvent in step (1) is diglycol or triglycol.

The present application also provides a tin disulfide nanomaterial prepared by the method for preparing sheet tin disulfide nanomaterials for efficient adsorption of organic dyes, wherein the sheet tin disulfide can be interconnected and assembled into a flower shape structure, and the diameter of the nanomaterial is 3 μm to 10 μm.

According to one of the embodiments of the present application, the triglycol is triethylene glycol.

According to one of the embodiments of the present application, the diglycol is diethylene glycol.

The beneficial effects of the present application are:
1. The prepared tin disulfide has a flower shape structure formed by interconnecting and assembling nano sheets. The diameter of the nanomaterial is 3 μm to 10 μm and has a high specific surface area.
2. The morphology and size of the provided tin disulfide nanomaterials can be controlled by adjusting parameters such as the reaction solvent, reaction temperature and time, and the proportion of the required precursor. The tin disulfide with different shapes/sizes has different adsorption performance, but still has a high specific surface area and high adsorption capacity.
3. Tin disulfide nanomaterials are synthesized by a simple solvothermal method, the synthesis process is simple, the cost is relatively low, and it is more conducive to industrial production.
4. The process of using the prepared tin disulfide adsorbent to adsorb the organic dye rhodamine B is carried out at normal temperature and pressure, the operation is simple, and it has broad application prospects in the field of adsorbing industrial organic dyes.

BRIEF DESCRIPTION OF THE DRAWINGS

FIG. 1 is the test report of the ionic rare earth ore used in the present application;

FIG. 5 is the test report of rare earth leaching concentration after application of the ionic rare earth leaching agent of Example 3 of the present application to rare earth raw ore;

FIG. 6 is the test report of rare earth leaching concentration after application of $(NH_4)_2SO_4$ leaching agent of Comparative Example 1 to rare earth raw ore;

FIG. 7 is the test report of rare earth leaching concentration after application of $(NH_4)_2SO_4$ and modified *sesbania* gum leaching agent of Comparative Example 1 to rare earth raw ore;

FIG. 8 is the test report of rare earth leaching concentration after application of amplification medium of Comparative Example 3 as leaching agent in rare earth raw ore;

DETAILED DESCRIPTION

Figure 2:
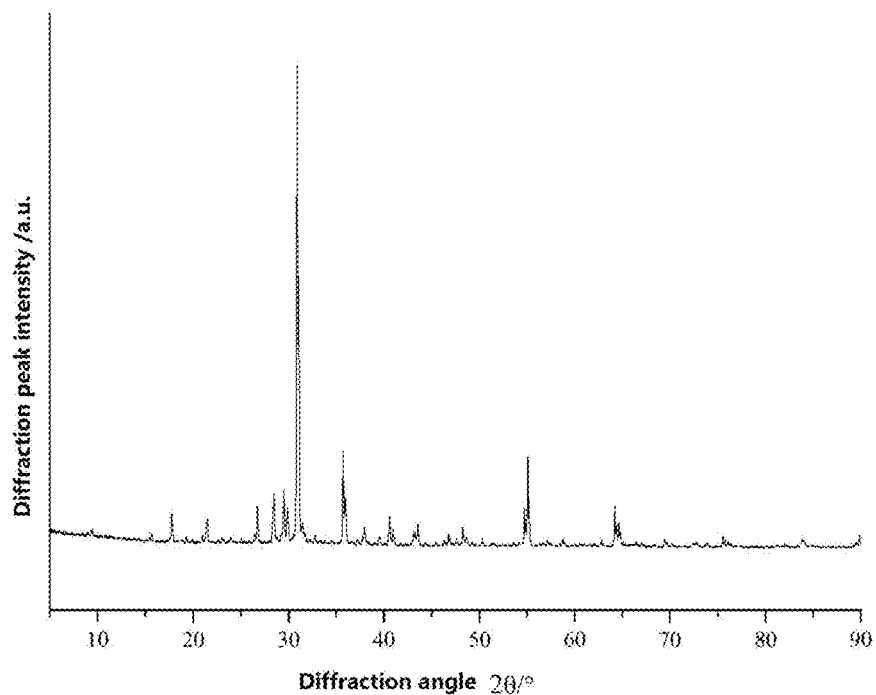
FIG. 2 is the XRD image of activated mineral powder of Example 3 of the present application.

The present application will be further described in detail below in conjunction with the examples, but the embodiments of the present application are not limited to the scope indicated by the examples.

The ionic rare earth ore and ionic rare earth ore powder mentioned in the examples of the present application are all obtained from ionic rare earth ore in Cenxi City, Wuzhou City, Guangxi Zhuang Autonomous Region. The ore powder is dry powder obtained by grinding ionic rare earth ore to below 200 meshes. The test report is shown in FIG. 1. The rare earth content of the ore sample is 0.12% in the whole phase and 0.062% in the ionic phase.

The rare earths in ionic rare earth ores can be divided into four phases: water-soluble phase, exchangeable ionic phase, mineral phase and colloidal phase, and the proportion of the four phases in the total rare earth is about <0.0001%, 50% to 90%, 1% to 10% and 5% to 40%. Water-soluble phase rare earth can be free in water that part of rare earth resources, and exchangeable ionic phase rare earth refers to hydroxyl or water and hydroxyl adsorbed on clay rare earth resources. Mineral phase refers to the rare earth ions that compose mineral lattices or disperse and form rock minerals. Colloidal rare earth refers to rare earth oxides or hydroxides that are insoluble in water, especially rare earth resources adsorbed on iron/manganese oxides. Among the above four rare earth resources, colloidal rare earth and mineral rare earth can not be used by direct substitution leaching, but by using strong acids such as sulfuric acid and hydrochloric acid or adding roasting acid leaching, converting them into the form of ions, so that cation substitution leaching which is more active than rare earth can be used. The present application is mainly aimed at leach exchangeable ionic phase of rare earth in mineral samples, and the total phase mentioned in the embodiment refers to the sum of the four phase states of rare earth.

Example 1

(1) Preparation of activated mineral powder: 20 g of anhydrous calcium chloride was added to 100 g of 200-mesh potassium feldspar powder, and roasted at 750° C. for 1 hour to obtain activated mineral powder for later use.

(2) Preparation of potassium-modified carboxymethyl *sesbania* gum: in a vacuum glove box, 1.0 g of *sesbania* gum and 1.5 g of potassium hydroxide were added to 100 mL of monochloroacetic acid solution, and stirred for 30 min at 21° C., the solution was placed in a strong alkaline environment, then vigorously stirred at 60° C. for 2.5 h, separated by suction filtration, and washed with alcohol twice to obtain potassium-modified carboxymethyl *sesbania* gum, which was designated as $SG-CH_2COOK$ for later use.

(3) Preparation of microbial suspension: *candida* was inoculated into the medium for domestication, the inoculation amount of microorganisms was $1.5 \times 10^7$/mL, the domestication temperature was 30° C., and the domestication time was 120 h. The medium contained 6.0 g/L peptone, 6.0 g/L amino acid, 22 g/L fructose, 4.5 g/L yeast extract, 0.3 g/L potassium nitrate, 0.4 g/L sodium chloride, 0.4 g/L potassium phosphate, 0.2 g/L magnesium sulfate, 0.1 g/L ferric sulfate, 1.2 g/L ionic rare earth mineral powder, 0.03 g/L activated mineral powder and the balance of water. A microbial suspension was obtained.

(4) Preparation of amplified culture medium: 27 g of the activated mineral powder obtained in step (1) and 5 mL of the microbial suspension in step (3) were added to 1 L of distilled water at 21° C. for amplification culture for 48 h to obtain the amplified culture medium.

(5) Preparation of ionic rare earth leaching agent: 0.8 g of $SG-CH_2COOK$ obtained in step (2) was added to 1 L of the amplified culture medium obtained in step (4), and mixed well to obtain an ionic rare earth leaching agent.

(6) The φ90×450 mm cylindrical empty pipe was fixed upright, the bottom of the column was fitted with a filter screen, 500 g of ionic rare earth ore was added and 250 g of the above ionic rare earth leaching agent was dripped in. After the leaching agent was dripped, water was slowly added to wash the leaching solution out of the ore body, and 320 mL of the leaching solution was collected. The rare earth leaching rate was 97.12%.

The pH value of the supernatant after precipitation of rare earths in the leaching solution was 8.2, the COD value was 68.9 mg/L, the ammonia nitrogen was 5.29 mg/L, and other detection indicators were in line with the emission standard of rare earth industry pollutants GB/T 26451-2011.

Example 2

(1) Preparation of activated mineral powder: 20 g of anhydrous calcium chloride was added to 100 g of 200-mesh lepidolite mineral powder, and roasted at 750° C. for 1 hour to obtain activated mineral powder for later use.

(2) Preparation of potassium-modified carboxymethyl *sesbania* gum: in a vacuum glove box, 1.5 g of *sesbania* gum and 4.2 g of potassium hydroxide were added to 100 mL of monochloroacetic acid solution, and stirred for 30 min at 21° C., the solution was placed in a strong alkaline environment, then vigorously stirred at 60° C. for 2.5 h, separated by suction filtration, and washed with alcohol twice to obtain potassium-modified carboxymethyl *sesbania* gum, which was designated as $SG-CH_2COOK$ for later use.

(3) Preparation of microbial suspension: *Pichia pastoris* was inoculated into the medium for domestication, the inoculation amount of microorganisms was $1.5 \times 10^7$/mL, the domestication temperature was 30° C., and the domestication time was 120 h. The medium contained 6.0 g/L peptone, 6.0 g/L amino acid, 22 g/L fructose, 4.5 g/L yeast extract, 0.3 g/L potassium nitrate, 0.4 g/L sodium chloride, 0.4 g/L potassium phosphate, 0.2 g/L magnesium sulfate, 0.1 g/L ferric sulfate, 1.2 g/L ionic rare earth mineral powder, 0.03 g/L activated mineral powder and the balance of water. A microbial suspension was obtained.

(4) Preparation of amplified culture medium: 27 g of the activated mineral powder obtained in step (1) and 5 mL of the microbial suspension in step (3) were added to 1 L of distilled water at 21° C. for amplification culture for 48 h to obtain the amplified culture medium.

(5) Preparation of ionic rare earth leaching agent: 0.8 g of $SG-CH_2COOK$ obtained in step (2) was added to 1 L of the amplified culture medium obtained in step (4), and mixed well to obtain the ionic rare earth leaching agent.

(6) The @90×450 mm cylindrical empty pipe was fixed upright, the bottom of the column was fitted with a filter screen, 500 g of ionic rare earth ore was added and 250 g of the above ionic rare earth leaching agent was dripped in. After the leaching agent was dripped, water was slowly added to wash the leaching solution out of the ore body, and 315 mL of the leaching solution was collected. The rare earth leaching rate was 92.41%.

The pH value of the supernatant after precipitation of rare earths in the leaching solution was 8.5, the COD value was 14.29 mg/L, the ammonia nitrogen was 5.96 mg/L, and other detection indicators were in line with the emission standard of rare earth industry pollutants GB/T 26451-2011.

Example 3

Figure 3:
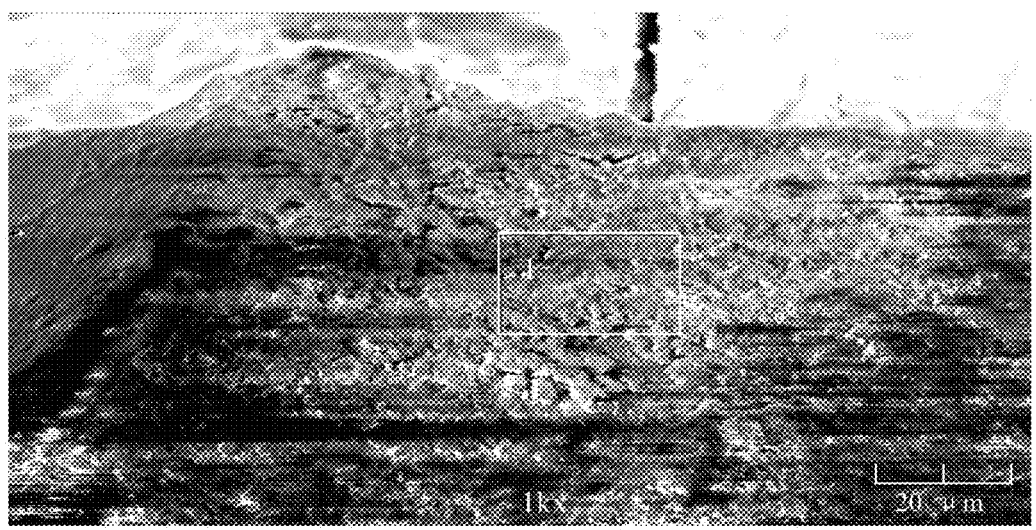
FIG. 3 is the SEM image of activated mineral powder of Example 3 of the present application.
Figure 4:
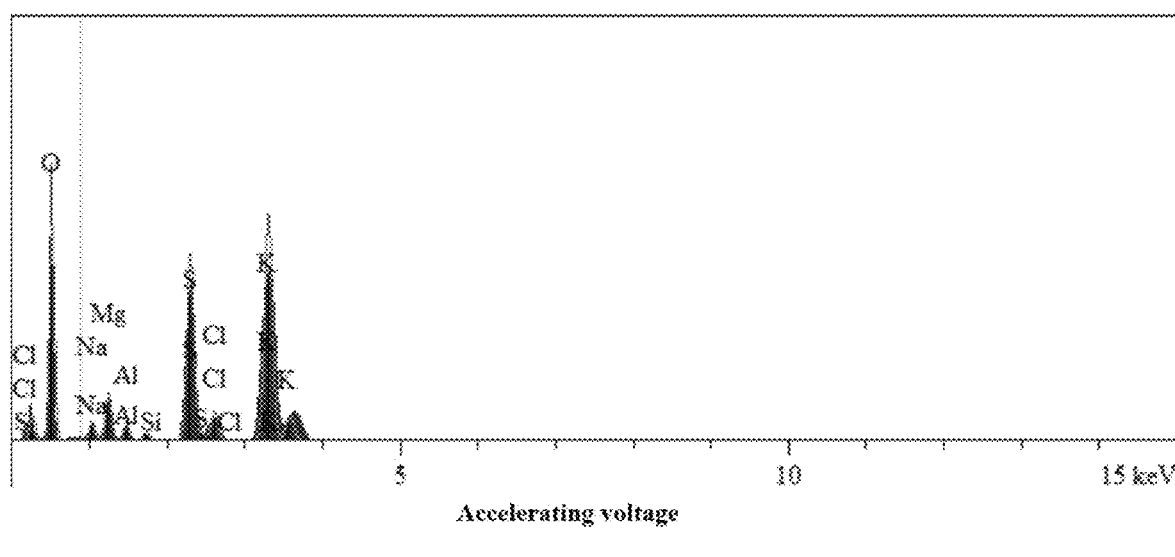
FIG. 4 is the EDS image of activated mineral powder of Example 3 of the present application.

(1) Preparation of activated mineral powder: 20 g of anhydrous calcium chloride was added to 100 g of 200-mesh bentonite mineral powder, and roasted at 750° C. for 1 hour to obtain activated mineral powder for later use. The obtained activated mineral powder was tested, and the results were shown in FIG. 2 to FIG. 4.

(2) Preparation of potassium-modified carboxymethyl sesbania gum: in a vacuum glove box, 2.0 g of sesbania gum and 4.2 g of potassium hydroxide were added to 100 mL of monochloroacetic acid solution, and stirred for 30 min at 21° C., the solution was placed in a strong alkaline environment, then vigorously stirred at 60° C. for 2.5 h, separated by suction filtration, and washed with alcohol twice to obtain potassium-modified carboxymethyl sesbania gum, which was designated as SG-CH$_2$COOK for later use.

(3) Preparation of microbial suspension: candida was inoculated into the medium for domestication, the inoculation amount of microorganisms was $1.5 \times 10^7$/mL, the domestication temperature was 30° C., and the domestication time was 120 h. The medium contained 6.0 g/L peptone, 6.0 g/L amino acid, 22 g/L fructose, 4.5 g/L yeast extract, 0.3 g/L potassium nitrate, 0.4 g/L sodium chloride, 0.4 g/L potassium phosphate, 0.2 g/L magnesium sulfate, 0.1 g/L ferric sulfate, 1.2 g/L ionic rare earth mineral powder, 0.03 g/L activated mineral powder and the balance of water. A microbial suspension was obtained.

(4) Preparation of amplified culture medium: 27 g of the activated mineral powder obtained in step (1) and 5 mL of the microbial suspension in step (3) were added to 1 L of distilled water at 21° C. for amplification culture for 48 h to obtain the amplified culture medium.

(5) Preparation of ionic rare earth leaching agent: 0.3 g of SG-CH$_2$COOK obtained in step (2) was added to 1 L of the amplified culture medium obtained in step (4), and mixed well to obtain an ionic rare earth leaching agent.

(6) The φ90×450 mm cylindrical empty pipe was fixed upright, the bottom of the column was fitted with a filter screen, 500 g of ionic rare earth ore was added and 250 g of the above ionic rare earth leaching agent was dripped in. After the leaching agent was dripped, water was slowly added to wash the leaching solution out of the ore body, and 300 mL of the leaching solution was collected. The rare earth leaching rate was 98.71%.

The pH value of the supernatant after precipitation of rare earths in the leaching solution was 8.46, the COD value was 36.5 mg/L, the ammonia nitrogen was 6.49 mg/L, and other detection indicators were in line with the emission standard of rare earth industry pollutants GB/T 26451-2011.

Example 4

(1) Preparation of activated mineral powder: 5 g of anhydrous calcium chloride was added to 100 g of 200-mesh sodium feldspar powder, and roasted at 400° C. for 5 h to obtain activated mineral powder for later use.

(2) Preparation of potassium-modified carboxymethyl sesbania gum: in a vacuum glove box, 3.0 g of sesbania gum and 5.0 g of potassium hydroxide were added to 100 mL of monochloroacetic acid solution, and stirred for 60 min at 15° C., the solution was placed in a strong alkaline environment, then vigorously stirred at 40° C. for 6 h, separated by suction filtration, and washed with alcohol twice to obtain potassium-modified carboxymethyl sesbania gum, which was designated as SG-CH$_2$COONa for later use.

(3) Preparation of microbial suspension: candida was inoculated into the medium for domestication, the inoculation amount of microorganisms was $1.5 \times 10^7$/mL, the domestication temperature was 15° C., and the domestication time was 240 h. The medium contained 3.0 g/L protein, 2.0 g/L urea, 2 g/L lignin, 1 g/L corn pulp, 0.1 g/L potassium nitrate, 0.1 g/L sodium chloride, 0.07 g/L potassium phosphate, 0.1 g/L magnesium sulfate, 0.05 g/L ferric sulfate, 0.5 g/L ionic rare earth mineral powder, 0.02 g/L activated mineral powder and the balance of water. A microbial suspension was obtained.

(4) Preparation of amplified culture medium: 2.5 g of the activated mineral powder obtained in step (1) and 5 mL of the microbial suspension in step (3) were added to 250 ml of distilled water at 15° C. for amplification culture for 240 h to obtain the amplified culture medium.

(5) Preparation of ionic rare earth leaching agent: 0.125 g of SG-CH$_2$COOK obtained in step (2) was added to 50 ml of the amplified culture medium obtained in step (4), and mixed well to obtain an ionic rare earth leaching agent.

(6) The φ90×450 mm cylindrical empty pipe was fixed upright, the bottom of the column was fitted with a filter screen, 500 g of ionic rare earth ore was added and 250 g of the above ionic rare earth leaching agent was dripped in. After the leaching agent was dripped, water was slowly added to wash the leaching solution out of the ore body, and 305 mL of the leaching solution was collected. The rare earth leaching rate was 93.25%.

The pH value of the supernatant after precipitation of rare earths in the leaching solution was 8.4, the COD value was 27.9 mg/L, the ammonia nitrogen was 7.69 mg/L, and other detection indicators were in line with the emission standard of rare earth industry pollutants GB/T 26451-2011.

Example 5

(1) Preparation of activated mineral powder: 40 g of anhydrous calcium carbonate was added to 100 g of 200-mesh bentonite, and roasted at 900° C. for 0.5 hour to obtain activated mineral powder for later use. The obtained activated mineral powder was tested.

(2) Preparation of potassium-modified carboxymethyl sesbania gum: in a vacuum glove box, 2.5 g of sesbania gum and 5.0 g of potassium hydroxide were added to 100 mL of monochloroacetic acid solution, and stirred for 5 min at 35° C., the solution was placed in a strong alkaline environment, then vigorously stirred at 80° C. for 1 h, separated by suction filtration, and washed with alcohol twice to obtain potassium-modified carboxymethyl sesbania gum, which was designated as SG-CH$_2$COOK for later use.

(3) Preparation of microbial suspension: candida was inoculated into the medium for domestication, the inoculation amount of microorganisms was $1.5 \times 10^7$/mL, the domestication temperature was 60° C., and the domestication time was 36 h. The medium contained 10.0 g/L peptone, 5.0 g/L amino acid, 30 g/L calcium carbonate, 10 g/L wort, 1.2 g/L potassium nitrate, 0.9 g/L sodium chloride, 0.7 g/L potassium phosphate, 0.9 g/L magnesium sulfate, 0.5 g/L ferric sulfate, 4 g/L ionic rare earth mineral powder, 6 g/L activated mineral powder and the balance of water. A microbial suspension was obtained.

(4) Preparation of amplified culture medium: 3 kg of the activated mineral powder obtained in step (1) and 5 mL of the microbial suspension in step (3) were added to 50 L of distilled water at 60° C. for amplification culture for 48 h to obtain the amplified culture medium.

(5) Preparation of ionic rare earth leaching agent: 100 g of SG-$CH_2$COOK obtained in step (2) was added to 50 L of the amplified culture medium obtained in step (4), and mixed well to obtain an ionic rare earth leaching agent.

(6) The φ90×450 mm cylindrical empty pipe was fixed upright, the bottom of the column was fitted with a filter screen, 500 g of ionic rare earth ore was added and 250 g of the above ionic rare earth leaching agent was dripped in. After the leaching agent was dripped, water was slowly added to wash the leaching solution out of the ore body, and 300 mL of the leaching solution was collected. The rare earth leaching rate was 92.76%.

The pH value of the supernatant after precipitation of rare earths in the leaching solution was 8.51, the COD value was 41.7 mg/L, the ammonia nitrogen was 11.22 mg/L, and other detection indicators were in line with the emission standard of rare earth industry pollutants GB/T 26451-2011.

Comparative Experiment

Comparative Example 1: 0.15 mol/L $(NH_4)_2SO_4$ was added to 500 mL of distilled water and stirred evenly to obtain leaching agent B; 325 mL of leaching solution was collected.

Comparative Example 2: 0.15 mol/L $(NH_4)_2SO_4$ and 0.15 g of the potassium-modified carboxymethyl *sesbania* gum of Example 3 were added to 500 mL of distilled water, and stirred evenly to obtain leaching agent C. 340 mL of leaching solution was collected.

Comparative Example 3: the amplified culture medium of Example 3 was used as the leaching agent D. 325 mL of leaching solution was collected.

Adopt the same leaching process as in Example 3: The φ90×450 mm cylindrical empty pipe was fixed upright, the bottom of the column was fitted with a filter screen, 500 g of 0.062% ionic rare earth ore was added and 250 g of the above-mentioned rare earths from Comparative Examples 1 to 10 rare earth leaching agent was dripped, water was added slowly after the leaching agent was dripped, so that the leaching solution can be washed out from the ore body, and stop collecting when the quality of the leaching solution exceeds 250 mL. The resulting leaching solution was sent to testing, and the results are shown in Table 1, and the testing originals are shown in FIGS. 5 to 8.

TABLE 1

| | Ionic rare earth ore | | Rare earth content of the ore sample | | |
| --- | --- | --- | --- | --- | --- |
| | | | Full phase 0.12 | Ionic phase 0.062 | |
| | | | | Rare earth | Leaching rate/% |
| | | Original | concentration in | Full | Ionic |
| | Leaching agent composition | number | leaching solution/mg/L | phase | phase |
| Example 3 | Amplified culture medium + SG-$CH_2$COOK | GX-11 | 1020.00 | 51.00 | 98.71 |
| Comparative Example 1 | $(NH_4)_2SO_4$ | GX-13 | 754.18 | 40.85 | 79.07 |
| Comparative Example 2 | $(NH_4)_2SO_4$ + SG-$CH_2$COOK | GX-14 | 775.52 | 43.95 | 85.06 |
| Comparative Example 3 | Amplified culture medium | GX-23 | 828.62 | 44.88 | 86.87 |

It can be seen from Table 1:
(1) Comparative example 1 and Comparative example 2 illustrate that when the traditional $(NH_4)_2SO_4$ was used as the leaching agent, the modified *sesbania* gum after modification helps to increase the leaching rate of ionic rare earths;
(2) Example 3 and Comparative Example 3 illustrate that the microbial suspension amplified culture medium and the modified *sesbania* gum have the effect of synergistically leaching ionic rare earths.
(3) Example 3 and Comparative Example 2, Comparative Example 1 and Comparative Example 3 all show that when the microbial suspension amplified culture medium was used as a leaching agent, the effect of leaching ionic rare earths is better than that of the traditional $(NH_4)_2SO_4$ leaching agent. The leaching rate of ionic rare earths is the highest in Example 3 of the present application in which the microbial suspension amplified culture medium synergistically modifies the *sesbania* gum.

Example 6

Figure 9:
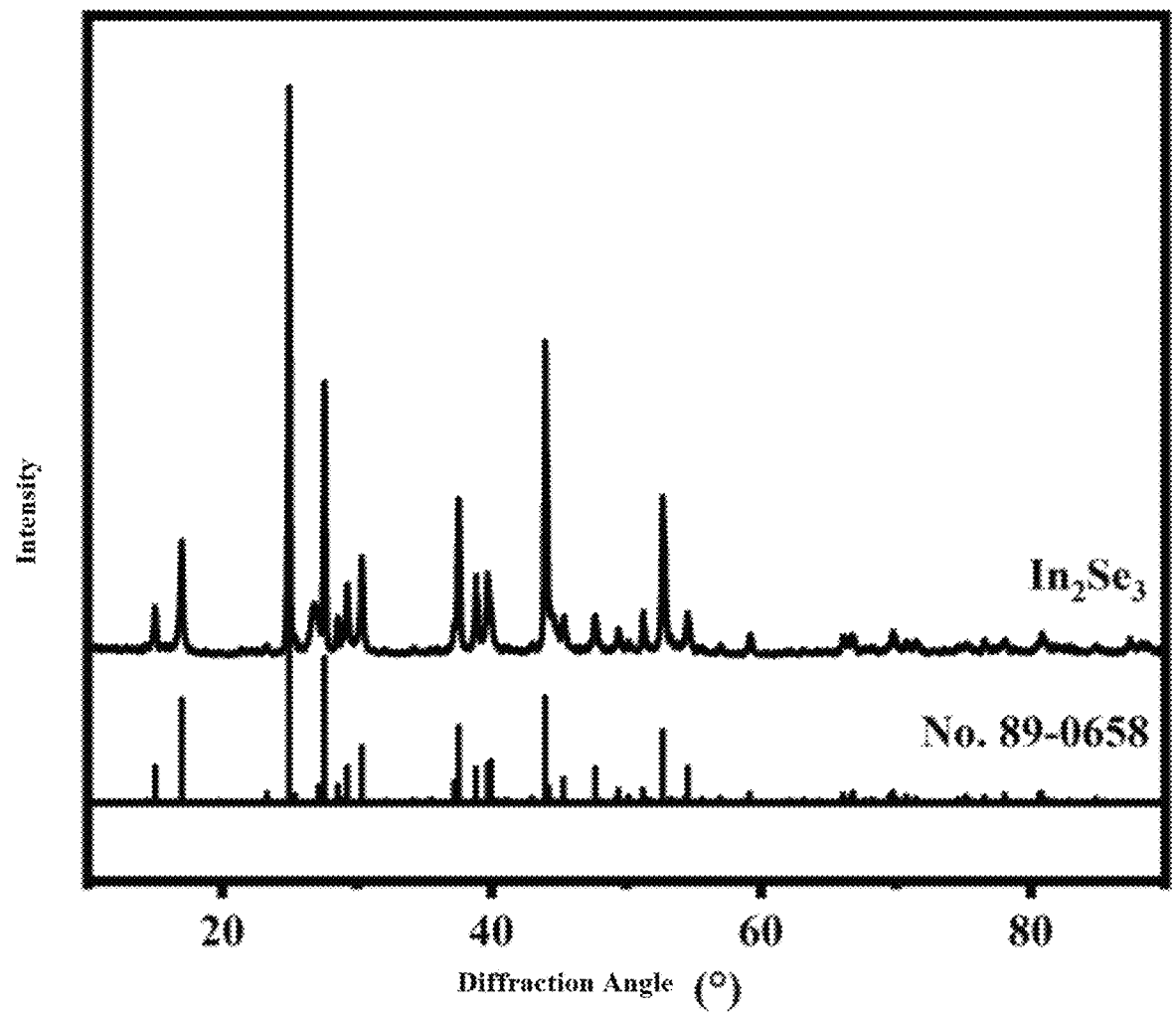
FIG. 9 is the X-ray diffraction image of the $In_2Se_3$ nanomaterial prepared by Example 6 of the present application.
Figure 10:
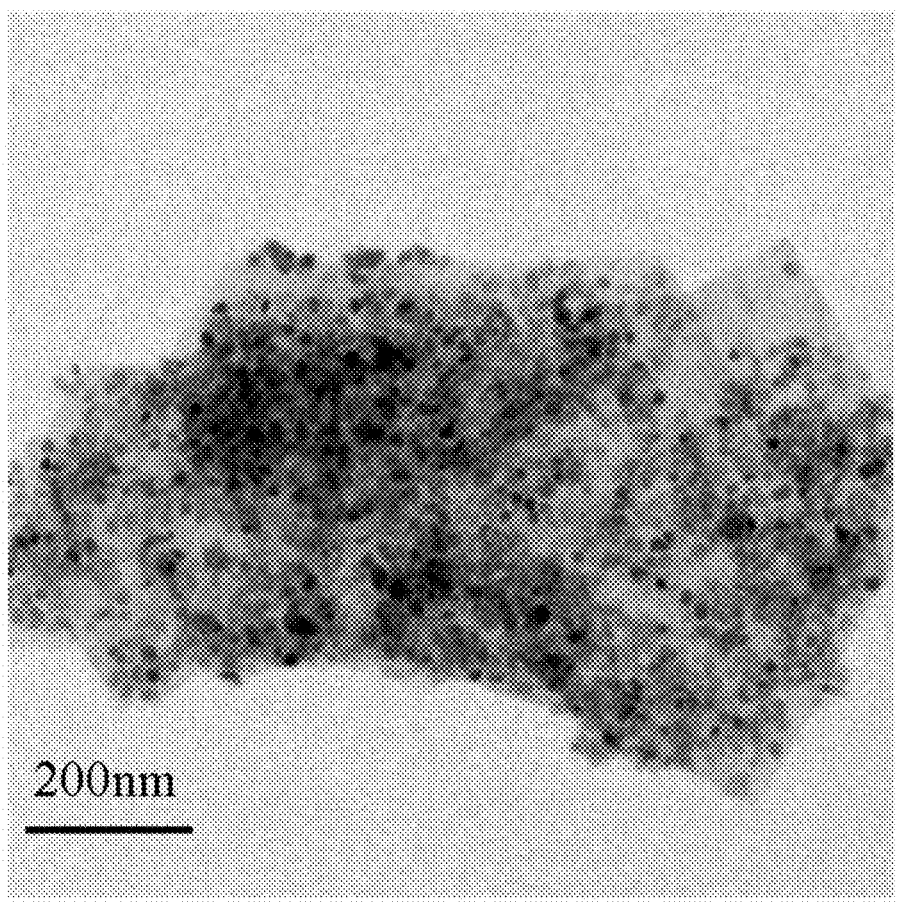
FIG. 10 is the transmission electron microscope low magnification photo of $In_2Se_3$ nanomaterial prepared by Example 6 of the present application, with a scale of 200 nm.
Figure 11:
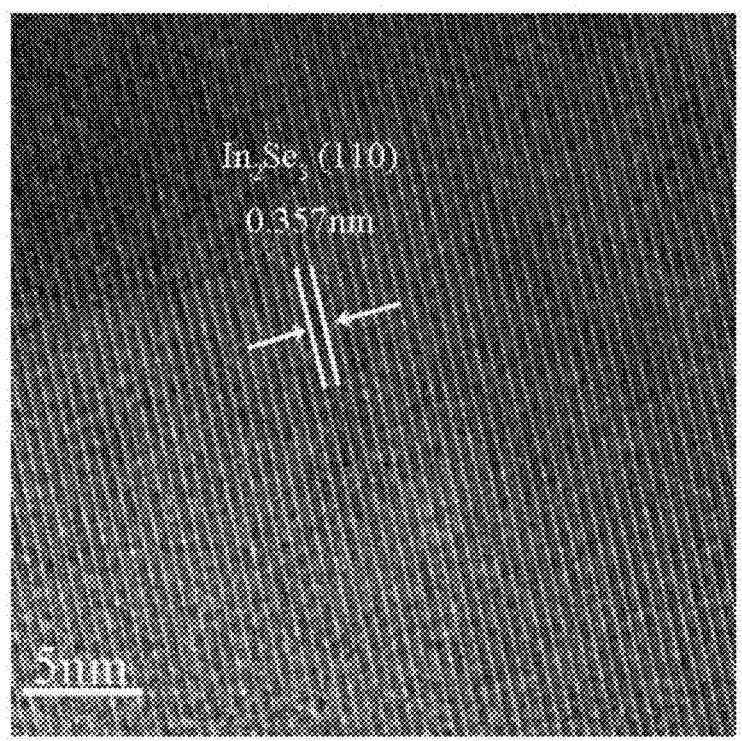
FIG. 11 is the transmission electron microscope high magnification photo of $In_2Se_3$ nanomaterial prepared by Example 6 of the present application, with a scale of 5 nm.
Figure 12:
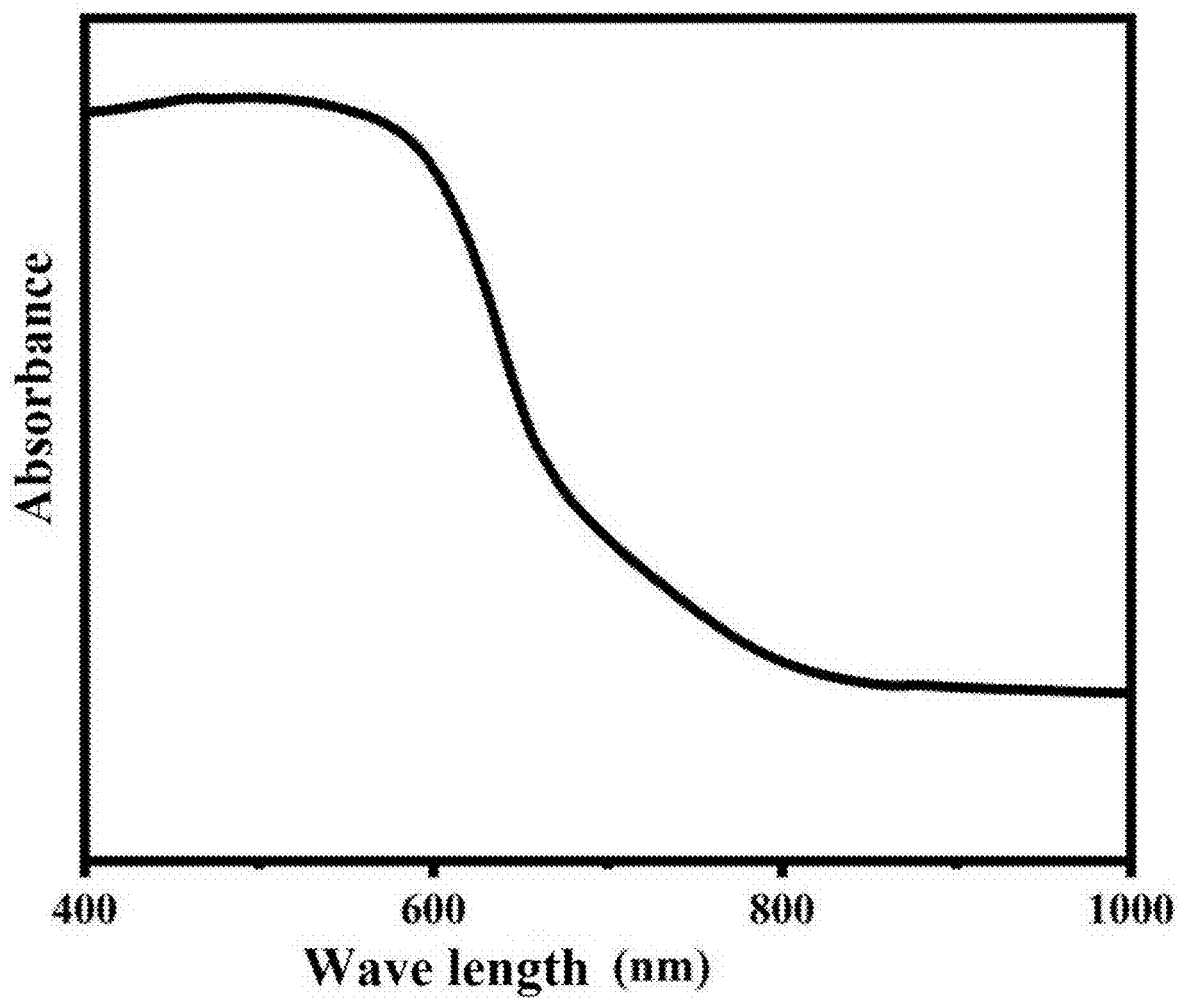
FIG. 12 is the UV-visible diffuse reflectance image of $In_2Se_3$ nanomaterial prepared by Example 6 of the present application.
Figure 13:
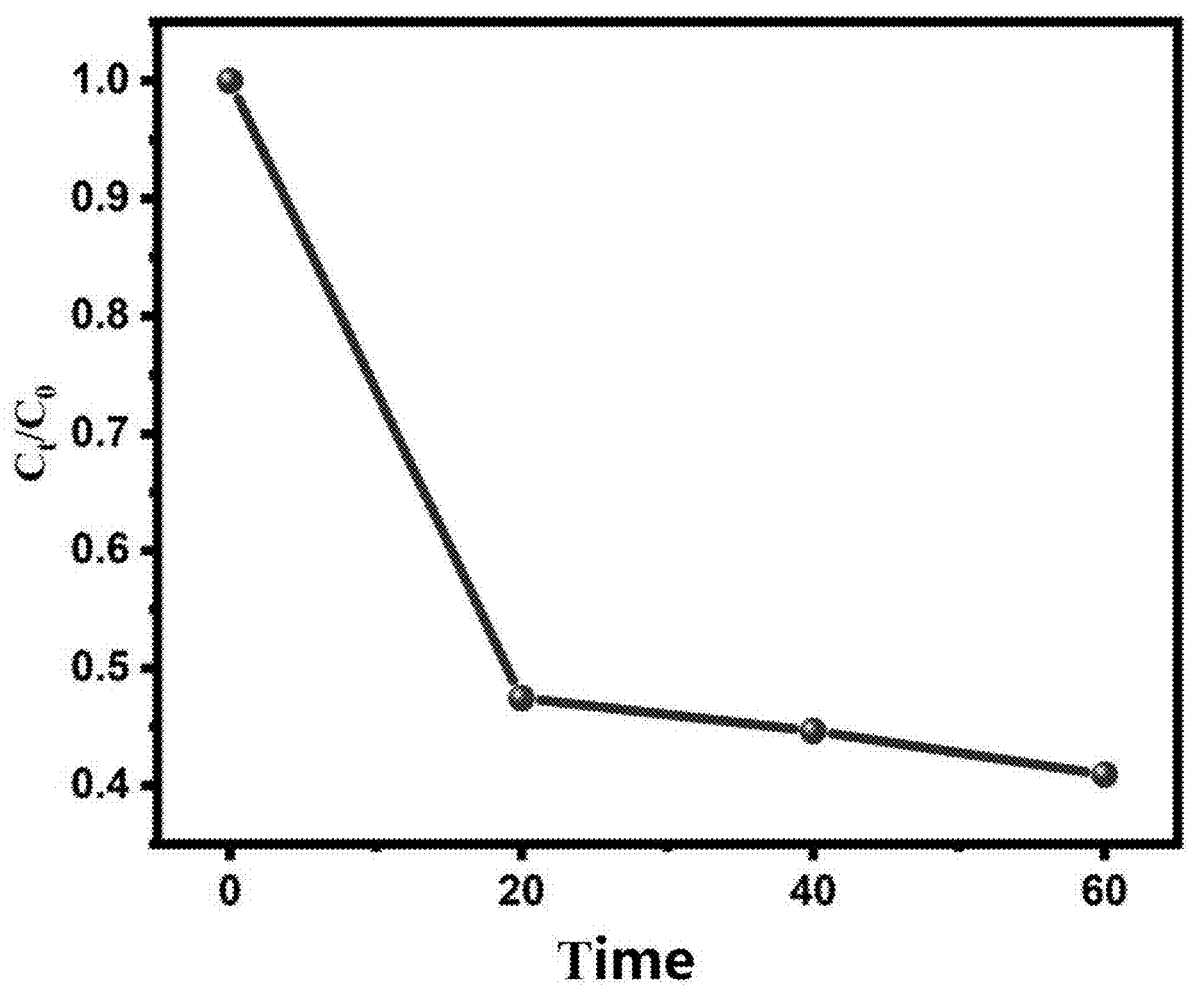
FIG. 13 shows the degradation rate of tetracycline by photocatalytic degradation of $In_2Se_3$ nanomaterial prepared in example 6 of the present application.

This example is an example of a method for preparing $In_2Se_3$ nanomaterials for photocatalytic degradation of tetracycline described in the present application, as follows:
2 mmol of indium chloride and 2 mmol of selenium powder were weighted, the above substances were added into 100 ml three-neckflask at room temperature, and then 16 ml of oleamine was injected into the three-neck flask; the three-neck flask was put in the electric heating jacket, heated to 60° C. and kept for 10 min, so that the sample was mixed well; then heated to 290° C. and held for 1 h to make it fully react. The whole reaction was stirred under the protection of argon. At the end of the procedure, the sample was naturally cooled to room temperature. After that, 12 ml of n-hexane was mixed with 4 ml of ethanol and washed repeatedly for 3 times. It was then vacuum dried and grinded into a powder. The obtained powder was again put into a three-neck flask, and a mixed solution of 10 ml toluene+10 ml 10% 3-mercaptopropionic acid aqueous solution was injected into the three-neck flask, and the mixture were stirred for 5 h. After that, they were washed with ethanol for 3 times, vacuum dried, and grinded to obtain a black indium selenide product. FIG. 9 shows the X-ray diffraction image of the product, and the obtained product is $In_2Se_3$. FIG. 10 shows the transmission electron microscope image of the product, and it can be observed that $In_2Se_3$ has the shape of both nanosheets and nanoparticles. FIG. 11 shows a high-resolution electron microscopic image of the $In_2Se_3$ nanometer photocatalyst. FIG. 12 shows the UV-visible absorption spectrum of $In_2Se_3$ nanometer photocatalyst.
20 mg/L of tetracycline (80 ml) was decomposed by 50 mg of indium selenide photocatalyst at normal temperature and pressure. The concentration of tetracycline was determined by UV-visible spectrophotometry, and the degradation rate was calculated according to the concentration. FIG. 13 shows the curve of tetracycline degradation rate and light time, and the degradation rate reached 53% in 20 min.

Example 7

This example is another example of a method for preparing $In_2Se_3$ nanomaterials for photocatalytic degradation of tetracycline described in the present application, as follows:
2 mmol of indium acetate and 3 mmol of selenium powder were weighted, the above substances were added into 100 ml three-neck flask at room temperature, and then 16 ml of dodecylamine was injected into the three-neck flask; the three-neck flask was put in the electric heating jacket, heated to 50° C. and kept for 20 min, so that the sample was mixed well; then heated to 280° C. and held for 1 h to make it fully react. The whole reaction was stirred under the protection of argon. At the end of the procedure, the sample was naturally cooled to room temperature. After that, 12 ml of n-hexane was mixed with 4 ml of ethanol and washed repeatedly for 3 times. It was then vacuum dried and grinded into a powder. The obtained powder was again put into a three-neck flask, and a mixed solution of 10 ml toluene+10 ml 10% 3-mercaptopropionic acid aqueous solution was injected into the three-neck flask, and the mixture were stirred for 8 h. After that, they were washed with ethanol for 3 times, vacuum dried, and grinded to obtain a black indium selenide product.
20 mg/L of tetracycline (80 ml) was decomposed by 50 mg of indium selenide photocatalyst at normal temperature and pressure. The concentration of tetracycline was determined by UV-visible spectrophotometry, and the degradation rate was calculated according to the concentration.

Example 8

This example is another example of a method for preparing $In_2Se_3$ nanomaterials for photocatalytic degradation of tetracycline described in the present application, as follows:
2 mmol of indium chloride and 4 mmol of selenium powder were weighted, the above substances were added into 100 ml three-neck flask at room temperature, and then 16 ml of cetylamine was injected into the three-neck flask; the three-neck flask was put in the electric heating jacket, heated to 70° C. and kept for 10 min, so that the sample was mixed well; then heated to 300° C. and held for 1 h to make it fully react. The whole reaction was stirred under the protection of argon. At the end of the procedure, the sample was naturally cooled to room temperature. After that, 12 ml of n-hexane was mixed with 4 ml of ethanol and washed repeatedly for 3 times. It was then vacuum dried and grinded into a powder. The obtained powder was again put into a three-neck flask, and a mixed solution of 10 ml toluene+10 ml 10% 3-mercaptopropionic acid aqueous solution was injected into the three-neck flask, and the mixture were stirred for 5 h. After that, they were washed with ethanol for 3 times, vacuum dried, and grinded to obtain a black indium selenide product.
20 mg/L of tetracycline (80 ml) was decomposed by 50 mg of indium selenide photocatalyst at normal temperature and pressure. The concentration of tetracycline was determined by UV-visible spectrophotometry, and the degradation rate was calculated according to the concentration.
The evaluation method of photocatalytic tetracycline degradation performance of the catalyst is as follows: 50 mg of $In_2Se_3$ is dispersed in tetracycline (80 ml) aqueous solution with a concentration of 20 mg/L. Before the photocatalytic experiment, the solution is adsorbed in the dark for 20 min, so that the photocatalyst and tetracycline aqueous solution reach adsorption-desorption equilibrium. Then the solution was irradiated by 300W xenon lamp. The concentration of tetracycline was measured by UV-visible spectrophotometry at intervals of 2 ml to 5 ml solution, and the photocatalytic degradation efficiency of tetracycline by $In_2Se_3$ catalyst was calculated.

Example 9

Figure 14:
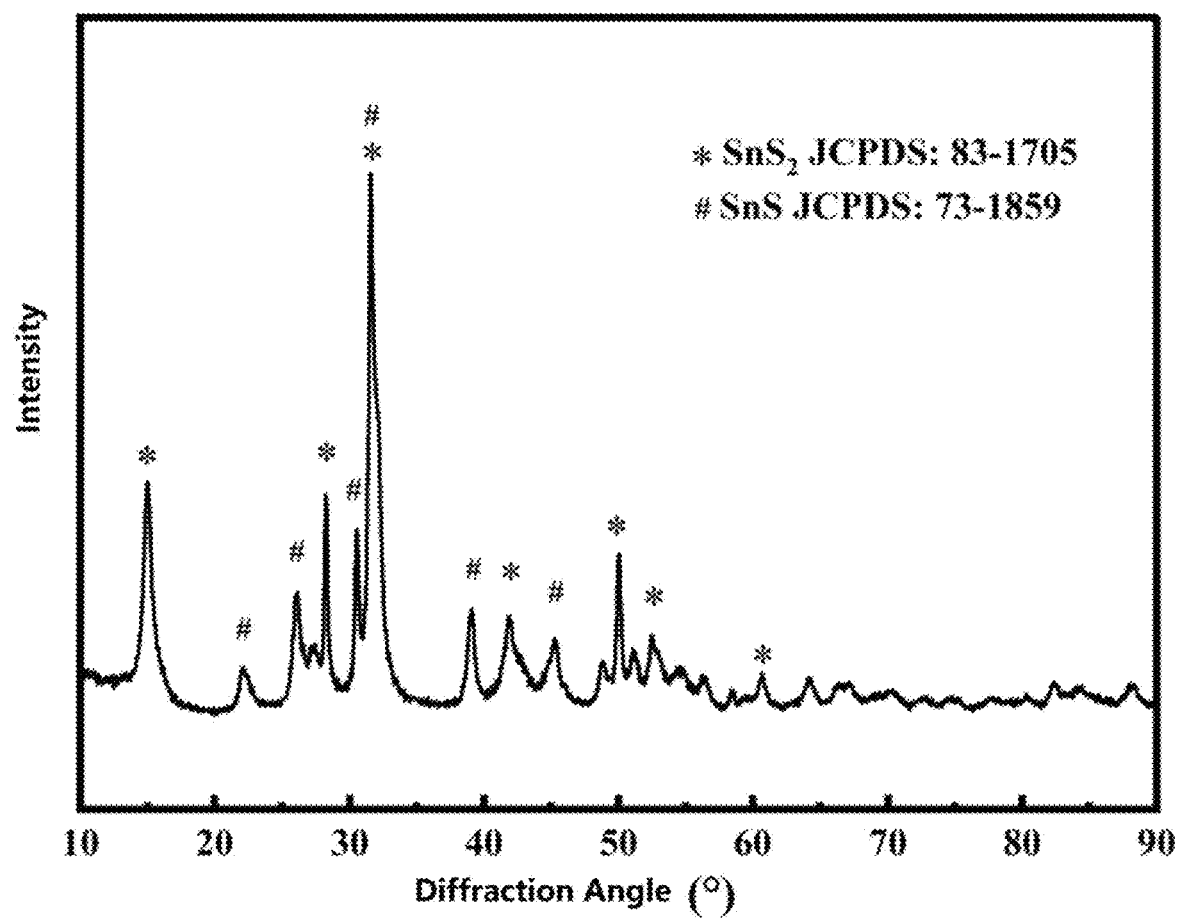
FIG. 14 shows the X-ray diffraction image of the tin disulfide nanomaterial prepared by Embodiment 9, where the horizontal coordinate is the 2θ diffraction Angle and the vertical coordinate is the diffraction intensity.
Figure 15:
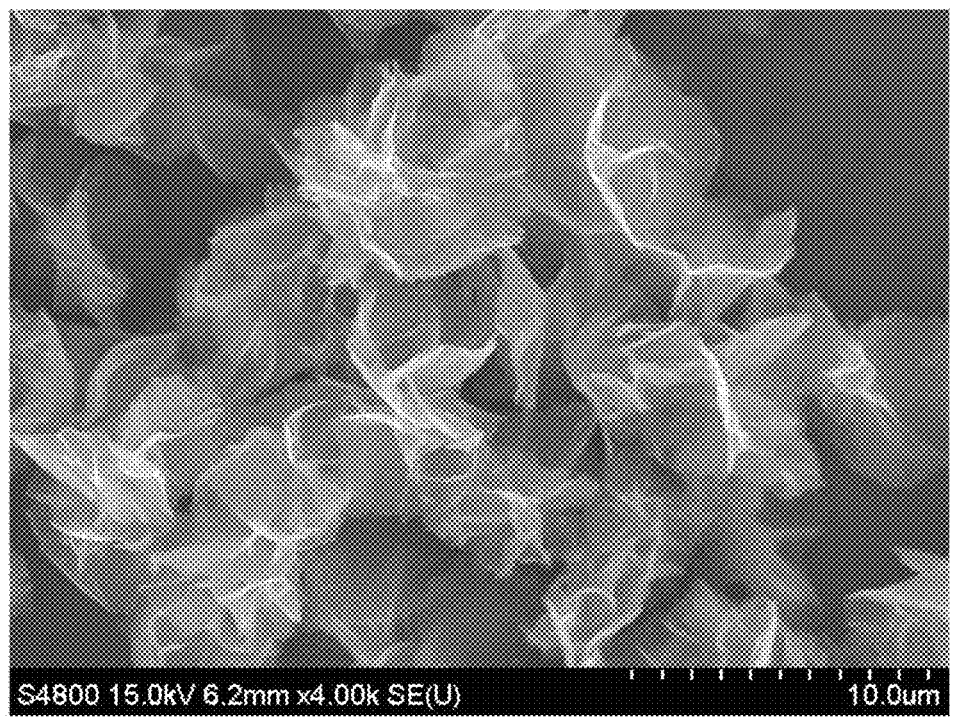
FIG. 15 is the scanning electron microscope (SEM) image of the tin disulfide nanomaterial prepared by Example 9.
Figure 16:
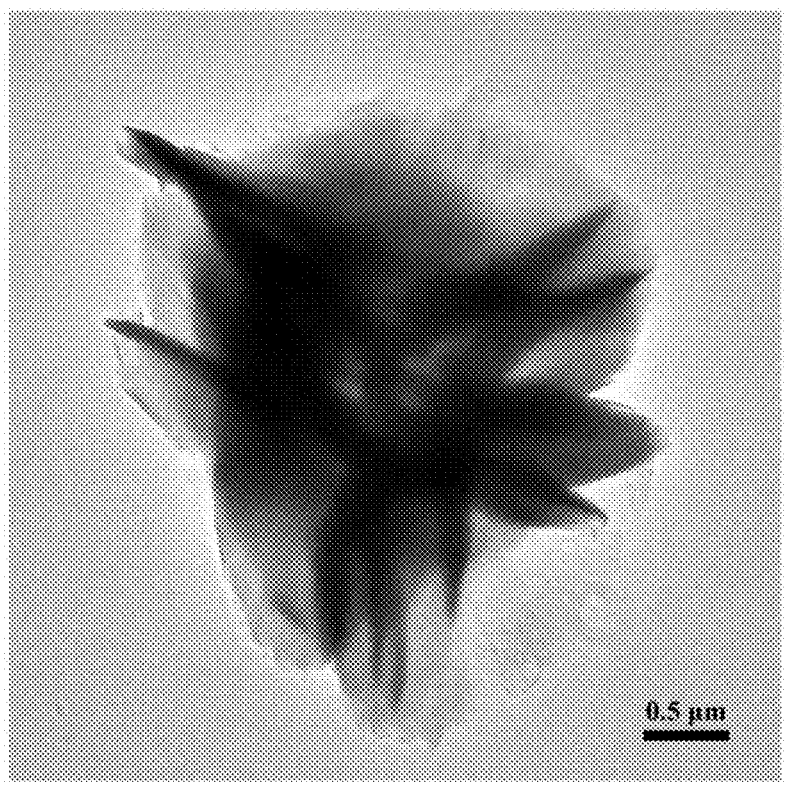
FIG. 16 is the transmission electron microscope (TEM) image of the tin disulfide nanomaterial prepared by Example 9.
Figure 17:
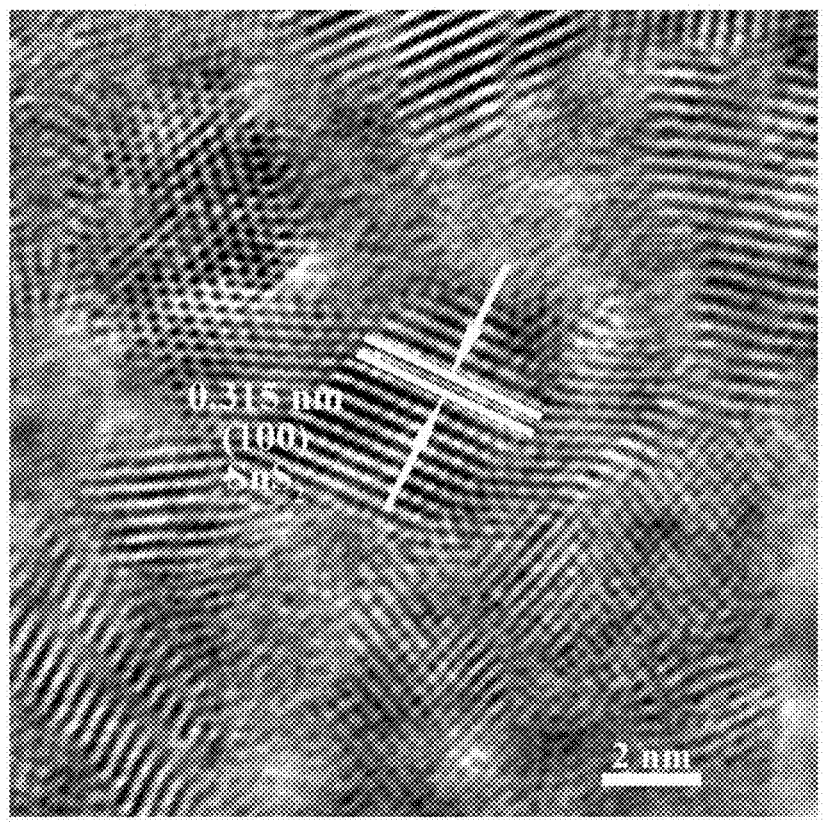
FIG. 17 is the high magnification transmission electron microscope (HRTEM) image of the tin disulfide nanomaterial prepared by Example 9.
Figure 18:
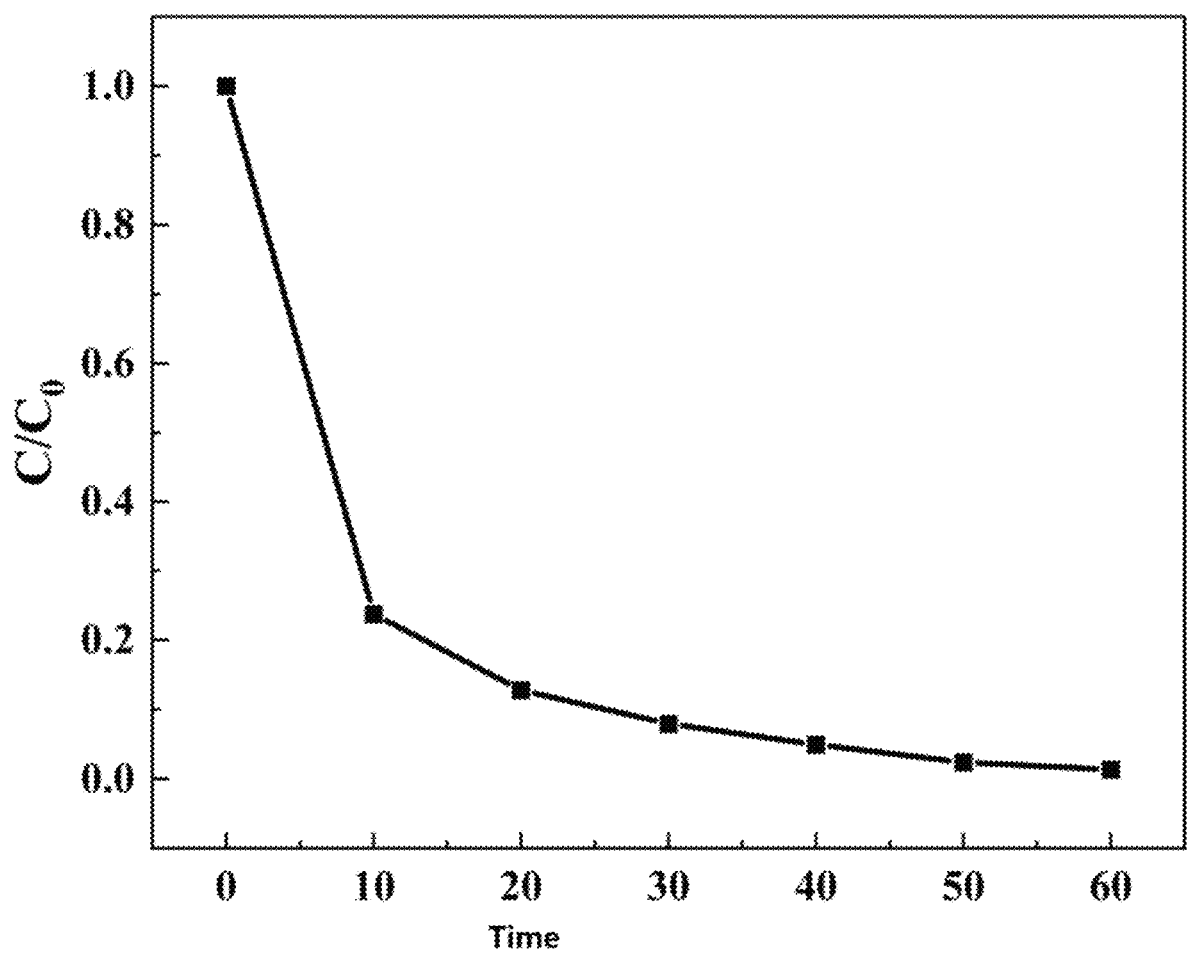
FIG. 18 shows the curve of the ratio of solution concentration and initial concentration with time when the tin disulphide nanomaterial prepared by Example 9 adsorbed organic solvent rhodamine B under dark conditions. The horizontal coordinate is time (min) and the vertical coordinate is $C/C_0$ (%).

The present embodiment is an example of the preparation method of sheet tin disulfide nanomaterial for efficient adsorption of organic dyes described in the present application, with the following steps:

2 mmol of stannous chloride dihydrate and 10 mmol of thiourea were added to 100 ml beaker, 35 mL of triethylene glycol was added to the beaker, followed by magnetic stirring at room temperature for 1 h to mix well. After the mixture was uniform, the solution in the beaker was transferred to a 50 mL of stainless steel reaction kettle lined with PTFE, and the reaction kettle was placed in a constant temperature blast drying oven, and the reaction temperature was set at 200° C. and the reaction time was 10 h. After the reactor was cooled to room temperature, the resulting product was centrifuged and repeatedly washed with deionized water and ethanol three times. Finally, the solid was dried in a vacuum oven at 60° C. for 8 h to obtain the tin disulfide nanomaterial. FIG. 14 shows the X-ray diffraction image of the product, which confirms that the prepared product is mainly tin disulfide, while containing a small amount of tin sulfide (SnS), and the crystallization of the material is good. FIG. 15 shows the scanning electron microscope image of tin disulfide. The obtained samples are homogeneous in morphology and size, and all of them are nanoflower-like structures self-assembled by two-dimensional nanosheets. FIG. 16 is the transmission electron microscope image of the prepared sample. FIG. 17 shows the HRTEM image of the prepared sample. FIG. 18 shows the adsorption performance of the prepared sample for organic solvent rhodamine B under dark conditions, with time (min) as the horizontal coordinate and C/C0 (%) as the ratio of solution concentration to initial concentration.

Example 10

The present embodiment is another example of the preparation method of sheet tin disulfide nanomaterial for efficient adsorption of organic dyes described in the present application, with the following steps:

2 mmol stannous chloride dihydrate and 15 mmol thiourea were added to 100 ml beaker, 35 mL triethylene glycol was added to the beaker, followed by magnetic stirring at room temperature for 1 h to mix well. After the mixture was uniform, the solution in the beaker was transferred to a 50 mL stainless steel reaction kettle lined with PTFE, and the reaction kettle was placed in a constant temperature blast drying oven, and the reaction temperature was set at 200° C. and the reaction time was 10 h. After the reactor was cooled to room temperature, the resulting product was centrifuged and repeatedly washed with deionized water and ethanol three times. Finally, the solid was dried in a vacuum oven at 60° C. for 8 h to obtain the tin disulfide nanomaterial.

Example 11

The present embodiment is another example of the preparation method of sheet tin disulfide nanomaterial for efficient adsorption of organic dyes described in the present application, with the following steps:

2 mmol of stannous chloride dihydrate and 15 mmol of thiourea were added to 100 mL beaker, 35 mL of triethylene glycol was added to the beaker, followed by magnetic stirring at room temperature for 1 h to mix well. After the mixture was uniform, the solution in the beaker was transferred to a 50 mL of stainless steel reaction kettle lined with PTFE, and the reaction kettle was placed in a constant temperature blast drying oven, and the reaction temperature was set at 220° C. and the reaction time was 8 h. After the reactor was cooled to room temperature, the resulting product was centrifuged and repeatedly washed with deionized water and ethanol three times. Finally, the solid was dried in a vacuum oven at 60° C. for 8 h to obtain the tin disulfide nanomaterial.

The evaluation method of organic dye adsorption performance of adsorbent is as follows: at room temperature (about 25° C.), 40 mg of the prepared tin disulfide adsorbent was placed in the reactor and 100 mL of rhodamine B solution with a concentration of 20 mg/L was injected, and the tin disulfide was fully dispersed in the rhodamine B solution under dark conditions, and 3 ml of supernatant was taken at regular intervals. The concentration of rhodamine B was determined by UV-visible spectrophotometry, and the adsorption rate of rhodamine B was calculated according to the concentration of tin disulfide adsorbent.

The above embodiments are only specific examples of the purpose, technical solution and beneficial effects of the present application in further detail, and the present application is not limited herein. Any modification, equivalent replacement, improvement, etc. made within the scope of disclosure of the present application shall be included in the scope of protection of the present application.

The invention claimed is:

1. A preparation method for ionic rare earth leaching agent, wherein, the method comprises the following steps:
   (1) domesticating microorganisms with rare earth activated mineral powder medium to obtain a microbial suspension; wherein the microorganisms are one or more of actinomycetes and *saccharomyces*; the rare earth activated mineral powder medium is composed of 2 to 30 g/L carbon source, 5 to 15 g/L nitrogen source, 1 to 10 g/L growth factor, 0.42 to 4.2 g/L inorganic salt, 0.52 to 10 g/L rare earth activated mineral powder and balance water; and the rare earth activated mineral powder is a combination of ionic rare earth mineral powder and activated mineral powder;
   (2) amplifying and culturing the microbial suspension and an additive to obtain the amplified culture medium; wherein the additive is activated mineral powder; and
   (3) mixing a modified *sesbania* gum with the amplified culture medium to obtain the ionic rare earth leaching agent; wherein, the *sesbania* gum is modified by adding 0.5 to 5.0 g of *sesbania* gum and 1.0 to 6.5 g of strong alkali solid to 100 mL of monochloroacetic acid solution, and stirring for 5 to 60 minutes at a temperature of 10 to 35° C., placing the solution in a strong alkaline environment, then vigorously stirring at 40° C. to 80° C. for 1 to 6 h, and separating by suction filtration to obtain alkali metal-modified carboxymethyl *sesbania* gum; and wherein, the activated mineral powder is prepared by adding an activator to the mineral powder containing active metals according to a weight percentage, and then roasting at 400° C. to 900° C. for 0.5 to 5 h; the activator is one or more of calcium chloride, sodium chloride, potassium carbonate, magnesium carbonate and calcium carbonate; the mineral powder containing active metals is one or more of mica powder, feldspar powder and bentonite; and the weight percentage is 5% to 40% of the weight of mineral powder containing active metals.

2. The preparation method for ionic rare earth leaching agent according to claim 1, wherein, the domesticating in step (1) is to inoculate the microorganisms into the rare earth activated mineral powder medium for cultivation, and the initial microbial inoculation amount is $\geq 1.2 \times 10^7$ cells/mL, the inoculation temperature is 15° C. to 60° C., and the domestication time is 36 h to 240 h to obtain a microbial suspension.

3. The preparation method for ionic rare earth leaching agent according to claim 2, wherein the actinomycete is *micromonospora*, and the *saccharomyces* is *candida* or *Pichia pastoris*, and the carbon source is one or more of fructose, lignin, calcium carbonate and protein; the nitrogen source is one or more of amino acid, protein, nitrate, peptone and urea; the growth factor is one or more of yeast extract, corn steep liquor and wort; and the inorganic salt is a combination of potassium nitrate, sodium chloride, potassium phosphate, magnesium sulfate and iron sulfate.

4. The preparation method for ionic rare earth leaching agent according to claim 3, wherein the amount of the potassium nitrate is 0.1 to 1.2 g/L, and the amount of the sodium chloride is 0.1 to 0.9 g/L, the amount of the potassium phosphate is 0.07 to 0.7 g/L, the amount of the magnesium sulfate is 0.1-0.9 g/L, the amount of the ferric sulfate is 0.05 to 0.5 g/L, and the amount of the ionic rare earth mineral powder is 0.5 to 4 g/L, and the amount of the activated mineral powder is 0.02 to 6 g/L.

5. The preparation method for ionic rare earth leaching agent according to claim 1, wherein, in the amplifying and culturing of step (2), the culture temperature is 15° C. to 60° C., and the culture time is 36 to 240 h, the additive is added by 1% to 6% of the mass of the amplified culture medium, and the volume ratio of the microorganism suspension to the amplified culture medium is 1:10000 to 1:50.

6. The preparation method for ionic rare earth leaching agent according to claim 1, wherein, the mica powder is lepidolite ore powder; and the feldspar powder is one or two of potassium feldspar ore powder and sodium ore powder.

7. The preparation method for ionic rare earth leaching agent according to claim 1, wherein, the amount of the modified *sesbania* gum is 0.05% to 0.2% of the mass of the ionic rare earth leaching agent.

* * * * *